United States Patent
Nakamura (10) Patent No.: US 11,722,785 B2
(45) Date of Patent: Aug. 8, 2023

(54) DETECTION APPARATUS CAPABLE OF DETECTING OCCURRENCE OF FLICKER, IMAGE CAPTURING APPARATUS, CONTROL METHOD, AND RECORDING MEDIUM

(71) Applicant: CANON KABUSHIKI KAISHA, Tokyo (JP)

(72) Inventor: Hinako Nakamura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/446,506

(22) Filed: Aug. 31, 2021

(65) Prior Publication Data

US 2022/0070356 A1 Mar. 3, 2022

(30) Foreign Application Priority Data

Sep. 3, 2020 (JP) .................................. 2020-148444

(51) Int. Cl.
*H04N 23/745* (2023.01)
*H04N 25/50* (2023.01)
*H04N 25/76* (2023.01)

(52) U.S. Cl.
CPC ........... *H04N 23/745* (2023.01); *H04N 25/50* (2023.01); *H04N 25/76* (2023.01)

(58) Field of Classification Search
None
See application file for complete search history.

(56) References Cited

U.S. PATENT DOCUMENTS

2007/0146501 A1* 6/2007 Matsuoka ............ H04N 5/2357
348/226.1

FOREIGN PATENT DOCUMENTS

| JP | 2009-111613 A | 5/2009 |
| JP | 2016-014762 A | 1/2016 |

* cited by examiner

*Primary Examiner* — Quan Pham
(74) *Attorney, Agent, or Firm* — Cowan, Liebowitz & Latman, P.C.

(57) ABSTRACT

A detection apparatus detects whether there is flicker attributed to a light source. The apparatus obtains a plurality of captured images related to a subject by performing image capture continuously with use of an image sensor; determines whether a capturing field angle has changed due to an operation of an image stabilizing mechanism during the image capture for the plurality of captured images; and detects whether flicker of a predetermined level has occurred based on the plurality of captured images. In a case where the apparatus has determined that the capturing field angle has changed due to the operation of the image stabilizing mechanism during the image capture for the plurality of captured images, the apparatus restricts regions in the plurality of captured images used for detecting whether the flicker of the predetermined level has occurred.

13 Claims, 6 Drawing Sheets

DETECTION APPARATUS CAPABLE OF DETECTING OCCURRENCE OF FLICKER, IMAGE CAPTURING APPARATUS, CONTROL METHOD, AND RECORDING MEDIUM

BACKGROUND OF THE INVENTION

Field of the Invention

The present invention relates to a detection apparatus, an image capturing apparatus, a control method, and a recording medium, and especially to a technique to detect flicker in an image capturing environment.

Description of the Related Art

In recent years, with the improvement in the sensing performance of image sensors and the development of image processing techniques, such image capturing apparatuses as digital cameras are capable of capturing images with a high degree of sensitivity. This enables image capturing at a high shutter speed even in a relatively dark image capturing environment, such as an indoor image capturing environment, thereby making it possible to obtain favorable captured images with reduced blur.

Incidentally, in the case of indoor image capturing, a light source that uses a commercial power source, such as a fluorescent lamp, may be arranged in an image capturing environment. As such a light source flickers in accordance with the frequency used in the commercial power source (flicker is occurred), the exposure and color temperature could possibly vary, or become uneven, in a single captured image or between captured images that have been captured continuously when the image(s) has been captured at a high shutter speed. For example, the unevenness presented as so-called surface flicker or line flicker occurs depending on an exposure (shutter) method and a signal readout period of a sensor. In order to reduce such an influence attributed to a light source, Japanese Patent Laid-Open No.2016-014762 discloses a technique to accumulate and read out charges multiple times at 600 fps, which corresponds to a commercial power source, and detect whether there is flicker and the frequency thereof based on changes in signal values indicated by obtained captured images.

Figure 6A:
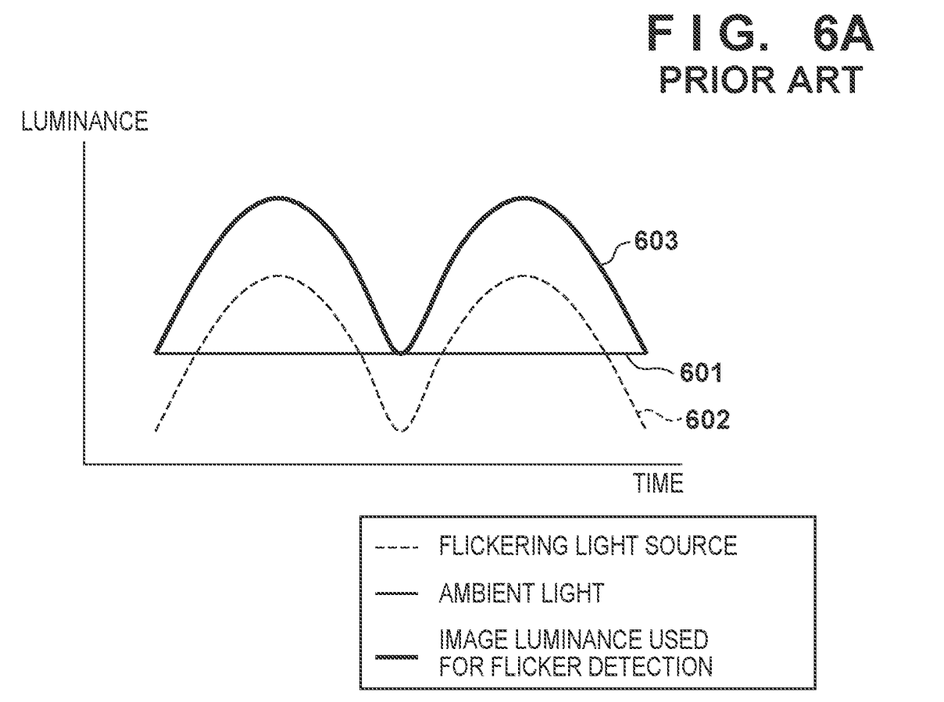
FIGS. 6A and 6B are diagrams for describing flicker detection for a case where the capturing field angle has changed.
Figure 6B:
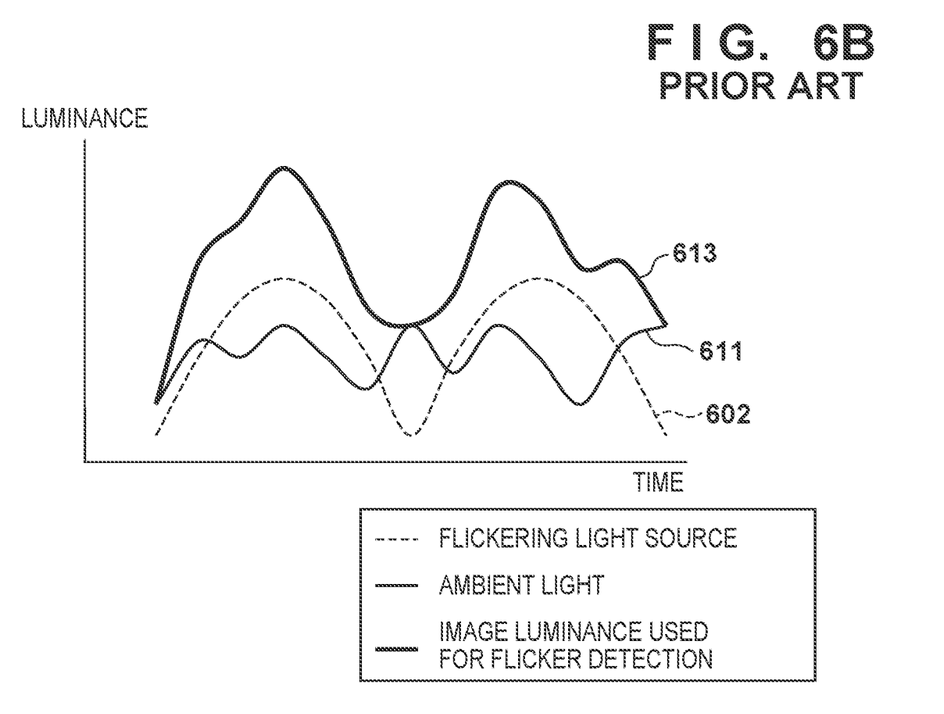

Incidentally, the method of detecting the occurrence of flicker based on a plurality of captured images, such as the one according to Japanese Patent Laid-Open No. 2016-014762, may not be capable of favorably detecting the occurrence of flicker in a case where the capturing field angle has changed during multiple image capturing sessions. For example, as shown in FIG. 6A, a plurality of captured images that have been obtained in a state where the capturing field angle is fixed show a luminance change 603 representing the state of the sum of luminance 601 of static ambient light and luminance 602 of a flickering light source, which fluctuates periodically; thus, flicker can be detected using the aforementioned method. On the other hand, in a case where the capturing field angle has changed during multiple image capturing sessions, as shown in FIG. 6B for example, luminance 611 of ambient light that appears in captured images is not constant, and consequently, a luminance change 613 that appears in the plurality of captured images does not indicate a periodical change, and the accuracy of detection of flicker could possibly decrease. Alternatively, there is a possibility that processing is delayed due to an excessive amount of computation associated with flicker detection, and images cannot be captured at the timings desired by a user.

In this respect, Japanese Patent Laid-Open No. 2019-111613 discloses a technique in which an unstable state where vibration is applied to an image capturing apparatus is excluded from the targets of flicker detection, and control for performing flicker detection is carried out on the condition that a transition has been made to a stable state; however, this is not a fundamental solution to the aforementioned problems.

SUMMARY OF THE INVENTION

The present invention has been made in view of the aforementioned problems, and provides a detection apparatus that favorably detects whether there is flicker even in a case where the capturing field angle has changed, an image capturing apparatus, a control method, and a recording medium.

The present invention in its first aspect provides a detection apparatus that detects whether there is flicker attributed to a light source, the detection apparatus comprising: a first obtainment unit configured to obtain a plurality of captured images related to a subject by performing image capture continuously with use of an image sensor; a determination unit configured to determine whether a capturing field angle has changed due to an operation of an image stabilizing mechanism during the image capture for the plurality of captured images; and a detection unit configured to detect whether flicker of a predetermined level has occurred based on the plurality of captured images obtained by the first obtainment unit, wherein in a case where the determination unit has determined that the capturing field angle has changed due to the operation of the image stabilizing mechanism during the image capture for the plurality of captured images, the detection unit restricts regions in the plurality of captured images used for detecting whether the flicker of the predetermined level has occurred.

The present invention in its second aspect provides an image capturing apparatus, comprising: an image sensor; a first obtainment unit configured to obtain a plurality of captured images related to a subject by performing image capture continuously with use of the image sensor; a determination unit configured to determine whether a capturing field angle has changed due to an operation of an image stabilizing mechanism during the image capture for the plurality of captured images; and a detection unit configured to detect whether flicker of a predetermined level has occurred based on the plurality of captured images obtained by the first obtainment unit, wherein in a case where the determination unit has determined that the capturing field angle has changed due to the operation of the image stabilizing mechanism during the image capture for the plurality of captured images, the detection unit restricts regions in the plurality of captured images used for detecting whether the flicker of the predetermined level has occurred.

The present invention in its third aspect provides a control method for a detection apparatus that detects whether there is flicker attributed to a light source, the control method comprising: obtaining a plurality of captured images related to a subject by performing image capture continuously with use of an image sensor; determining whether a capturing field angle has changed due to an operation of an image stabilizing mechanism during the image capture for the plurality of captured images; and detecting whether flicker of a predetermined level has occurred based on the plurality of captured images obtained in the obtaining, wherein in a case where it has been determined, in the determining, that the capturing field angle has changed due to the operation of the image stabilizing mechanism during the image capture for the plurality of captured images, the detecting restricts regions in the plurality of captured images used for detecting whether the flicker of the predetermined level has occurred.

The present invention in its fourth aspect provides a computer-readable recording medium having recorded therein a program for causing a computer to function as each unit of the detection apparatus of the first aspect.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

An embodiment described below pertains to an example in which the present invention is applied to a digital camera that has an image stabilizing mechanism for an optical image stabilizer (OIS) as one example of a detection apparatus. However, the present invention is applicable to any device that is capable of detecting whether there is flicker based on a plurality of captured images.

<<Configuration of Digital Camera>>

Figure 1:
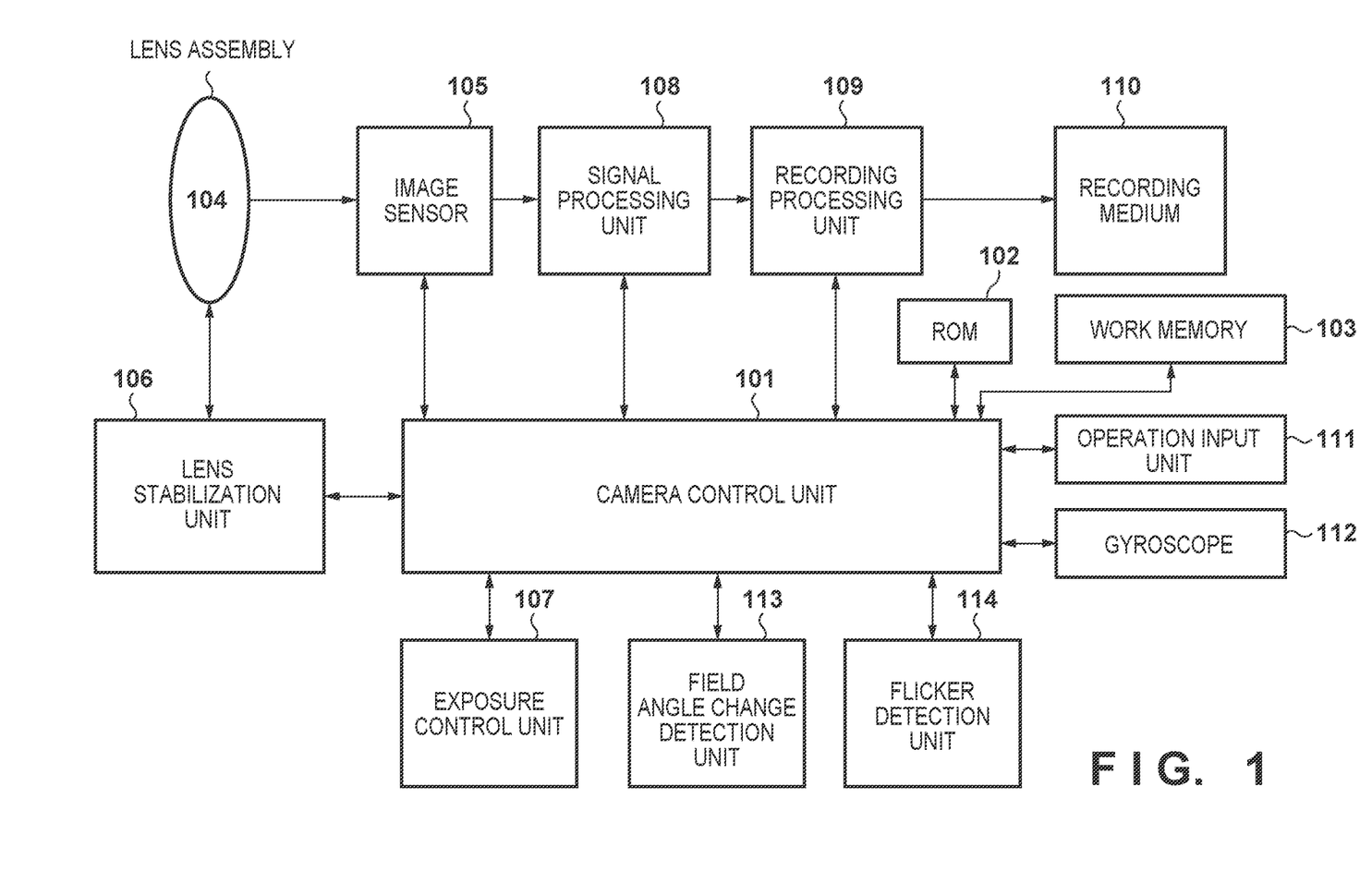
FIG. 1 is a block diagram showing a functional configuration of a digital camera 100 according to embodiments and exemplary modifications of the present invention.

FIG. 1 is a block diagram showing a functional configuration of a digital camera 100 according to embodiments of the present invention.

A camera control unit 101 is, for example, a CPU, and controls the operations of each block included in the digital camera 100. The camera control unit 101 controls the operations of each block by, for example, reading out an operation program for each block recorded in a ROM 102, deploying the operation program to a work memory 103, and executing the operation program.

The ROM 102 is, for example, a rewritable nonvolatile memory, such as a flash ROM. The ROM 102 stores parameters and the like necessary for the operations of each block included in the digital camera 100, in addition to the operation program for each block. On the other hand, the work memory 103 is a rewritable volatile memory. The work memory 103 is used not only as a region to which the operation program for each block included in the digital camera 100 is deployed, but also as a temporary storage region for intermediate data that has been output through the operations of each block, or as a computation region for performing various types of processing.

An image sensor 105 is, for example, an image sensor, such as a CCD or CMOS sensor, captures an image by photoelectrically converting an optical image of a subject formed on an image capturing surface of the image sensor via a lens assembly 104, and outputs analog image signals. Here, the lens assembly 104 is an optical system of the digital camera 100, and is configured to include various types of lenses, a mechanism that controls exposure with use of a diaphragm, an image stabilizing mechanism for optical image stabilization that prevents blurring in image formation caused by a camera shake, and a mechanism that controls focusing and zoom operations. As stated earlier, the digital camera 100 of the present embodiment is configured so as to enable image stabilization for optical image stabilization. More specifically, the lens assembly 104 includes a non-illustrated shift lens, and the aforementioned image stabilizing mechanism has a driving mechanism that changes (shifts) the position of this shift lens in the vertical direction and the horizontal direction on a plane that is perpendicular to an optical axis. Driving and controlling of this image stabilizing mechanism are performed by a later-described lens stabilization unit 106.

Image capturing performed by the image sensor 105 is controlled by an exposure control unit 107. More specifically, the exposure control unit 107 determines an exposure condition based on an image capturing mode set on the digital camera 100, the state of the lens assembly 104, and information of the brightness of a subject. Then, based on the determined exposure condition, the exposure control unit 107 controls relevant members so that they are placed in the control positions and control states corresponding to an exposure value by, for example, controlling the opening of a non-illustrated shutter that can be included in the image sensor 105 and controlling driving of the diaphragm; as a result, exposure control related to image capturing is performed.

The analog image signals output from the image sensor 105 are converted into digital image signals (hereinafter referred to as a captured image) by a signal processing unit 108 applying various types of signal processing, including D/A conversion, luminance correction such as gain correction, and color correction such as white balance correction. The captured image is converted into a recording format set for the digital camera 100 as a result of being output to a recording processing unit 109, and recorded into a recording medium 110 that can be, for example, a memory card or the like that is connected to the digital camera 100 in an attachable and removable manner. Also, in the digital camera 100 of the present embodiment, a plurality of captured images that have been obtained through multiple image capturing sessions are stored to the work memory 103 when a later-described flicker detection unit 114 detects whether there is flicker.

A gyroscope 112 is a sensor that detects a change in the orientation (a change in the angle, angular acceleration) of the digital camera 100, and outputs information related to the orientation (state information). Although the description is provided assuming that the digital camera 100 of the present embodiment includes the gyroscope 112 that detects the state of the digital camera 100, the gyroscope 112 may be replaced with another sensor, or the digital camera 100 may include another sensor. For example, an acceleration sensor and the like may be included so as to detect a change in the position and a movement amount of the digital camera 100.

As stated earlier, in order to reduce the influence on a captured image attributed to the changes in the position and orientation of the digital camera 100, the digital camera 100 of the present embodiment includes an image stabilizing mechanism associated with optical image stabilization as an image stabilizing mechanism, as well as the lens stabilization unit 106 that controls and drives the same. More specifically, in a case where a camera shake has occurred during an exposure period, the position of formation of a subject image on the image sensor 105 changes (image blur), and an obtained captured image is subjected to a reduction in image quality, such as blurring of the image of the subject. Therefore, the lens stabilization unit 106 moves the position of formation of the subject image on the image sensor 105 by controlling the position of the shift lens, thereby reducing image blur. More specifically, the lens stabilization unit 106 drives and controls the image stabilizing mechanism for the lens assembly 104 so as to change the position of the shift lens (move the shift lens in the direction in which image blur is cancelled out) based on information of a driving amount (shift amount) that has been derived based on the output from the gyroscope 112. As a result, the optical images associated with the same subject are formed on a certain position on the image sensor 105, and image blur is reduced.

An operation input unit 111 represents various types of user interfaces included in the digital camera 100, such as a mode switching dial, a release switch, and a set button. Upon detecting that an operational input has been made with respect to these user interfaces, the operation input unit 111 outputs, to the camera control unit 101, a control signal corresponding to the operational input that has been made.

The flicker detection unit 114 detects flicker in relation to an image capturing environment. More specifically, the flicker detection unit 114 derives whether there is flicker, as well as the flicker frequency thereof when there is flicker, based on a plurality of captured images (hereinafter referred to as a detected image group) that have been captured by the image sensor 105 at predetermined timings and accumulated in the work memory 103. Here, it is assumed that the detected image group is obtained by accumulating and reading out charges at a predetermined frequency as described in Japanese Patent Laid-Open No. 2016-014762. This frequency can be set in such a manner that the detection is possible in a case where, for example, the illumination arranged in the image capturing environment is driven by a commercial power source of either 50 Hz or 60 Hz.

With respect to the detected image group used in the detection performed by the flicker detection unit 114, a field angle change detection unit 113 detects whether the capturing field angle has changed during image capture therefor, more specifically, whether there has been a change in the capturing field angle that can influence flicker detection. The description is provided assuming that, in the digital camera 100 of the present embodiment, the field angle change detection unit 113 detects a change in the capturing field angle that occurs due to driving of the image stabilizing mechanism associated with optical image stabilization as one example of a change in the capturing field angle. Specifically, the field angle change detection unit 113 is configured to be capable of obtaining information of a driving status of this image stabilizing mechanism, and detects whether the capturing field angle has changed based on the obtained information of the driving status.

Incidentally, in a state where image stabilization performed by the image stabilizing mechanism for optical image stabilization is in operation in a favorable manner, the luminance of ambient light for stabilization of the capturing field angle is stable, and flicker detection can be performed similarly to a state where the capturing field angle is fixed as shown in FIG. 6A. On the other hand, in a case where this image stabilizing mechanism performs an operation that is not intended for image stabilization, the capturing field angle could possibly fluctuate among captured images that are captured during this operation; this, consequently, could possibly lead to a status where the luminance of environment light is not stable, similarly to FIG. 6B. Here, the operation that is not intended for image stabilization may include, for example, an operation that is performed irrespective to the output from the gyroscope 112, such as an initialization operation that is performed at the time of activation of the digital camera 100. Other than this, for example, the operation may also include a driving operation for making a transition to a predetermined driving position/state in order to enable subsequent image stabilization immediately before shooting of a still image, or when the driving position of the shift lens has reached an end of a movable range.

Therefore, the field angle change detection unit 113 of the present embodiment determines, for example, whether the information of the driving status of the image stabilizing mechanism includes information indicating that the image stabilizing mechanism for optical image stabilization has performed the operation that is not intended for image stabilization (during image capture for the detected image group). Then, in a case where the information of the driving status of the image stabilizing mechanism includes the information indicating that the operation that is not intended for image stabilization has been performed, the field angle change detection unit 113 detects that there has been a change in the capturing field angle that could possibly influence flicker detection.

The present embodiment is described assuming that processing is realized by circuits and processors that correspond to respective blocks that are included in the digital camera 100 as hardware. However, embodiments of the present invention are not limited to this, and processing of at least a part of the blocks may be realized by a program that performs processing similar to the processing performed by these blocks.

<<Flicker Detection Processing>>

Figure 2:
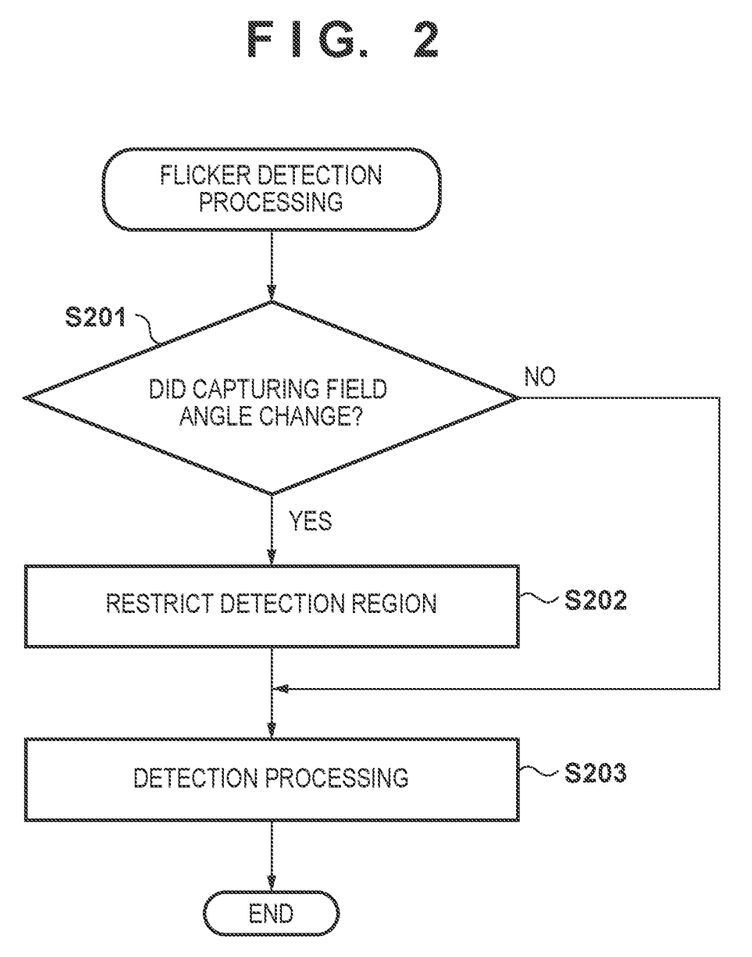
FIG. 2 is a flowchart exemplarily showing flicker detection processing that is executed by the digital camera 100 according to embodiments and exemplary modifications of the present invention.

Using a flowchart of FIG. 2, the following describes specific processing in relation to flicker detection processing that is executed in association with flicker detection in the digital camera 100 of the present embodiment configured in the foregoing manner. The processing corresponding to this flowchart can be realized by the camera control unit 101 reading out a corresponding processing program stored in, for example, the ROM 102, deploying the processing program to the work memory 103, and executing the processing program. The present flicker detection processing will be described assuming that it is started when, for example, predetermined conditions for performing flicker detection are satisfied and a predetermined number of (a plurality of) captured images (a detected image group) pertaining to this flicker detection are stored to the work memory 103. Here, the predetermined conditions for performing flicker detection may include a condition in which the digital camera 100 has been activated in a shooting mode, a condition in which a change in the illumination state has been detected, a condition in which a shooting preparation instruction has been issued, and the like. It is also assumed that each captured image included in the detected image group is associated with information of a driving amount (shift amount) of the shift lens at the time of image capture for this image.

In step S201, the field angle change detection unit 113 determines whether the capturing field angle changed during image capture for the detected image group stored in the work memory 103 under control of the camera control unit 101. In other words, in the present step, whether the luminance of ambient light is stable in the detected image group that has been captured is determined. It is assumed that, in executing processing of the present step, the field angle change detection unit 113 has obtained information of the driving status of the image stabilizing mechanism associated with optical image stabilization from the lens stabilization unit 106 or the camera control unit 101. When the field angle change detection unit 113 has determined that the capturing field angle changed during image capture for the detected image group, processing proceeds to step S202; when the field angle change detection unit 113 has determined that the capturing field angle did not change, processing proceeds to step S203.

Note that although the present embodiment has been described assuming that the field angle change detection unit 113 determines whether the capturing field angle changed during image capture for the detected image group based on information of the driving status of the image stabilizing mechanism associated with optical image stabilization, embodiments of the present invention are not limited to this. Whether this image stabilizing mechanism is performing the relevant operation may be determined based on the transition of the shift amount associated with the detected image group.

Figure 3:
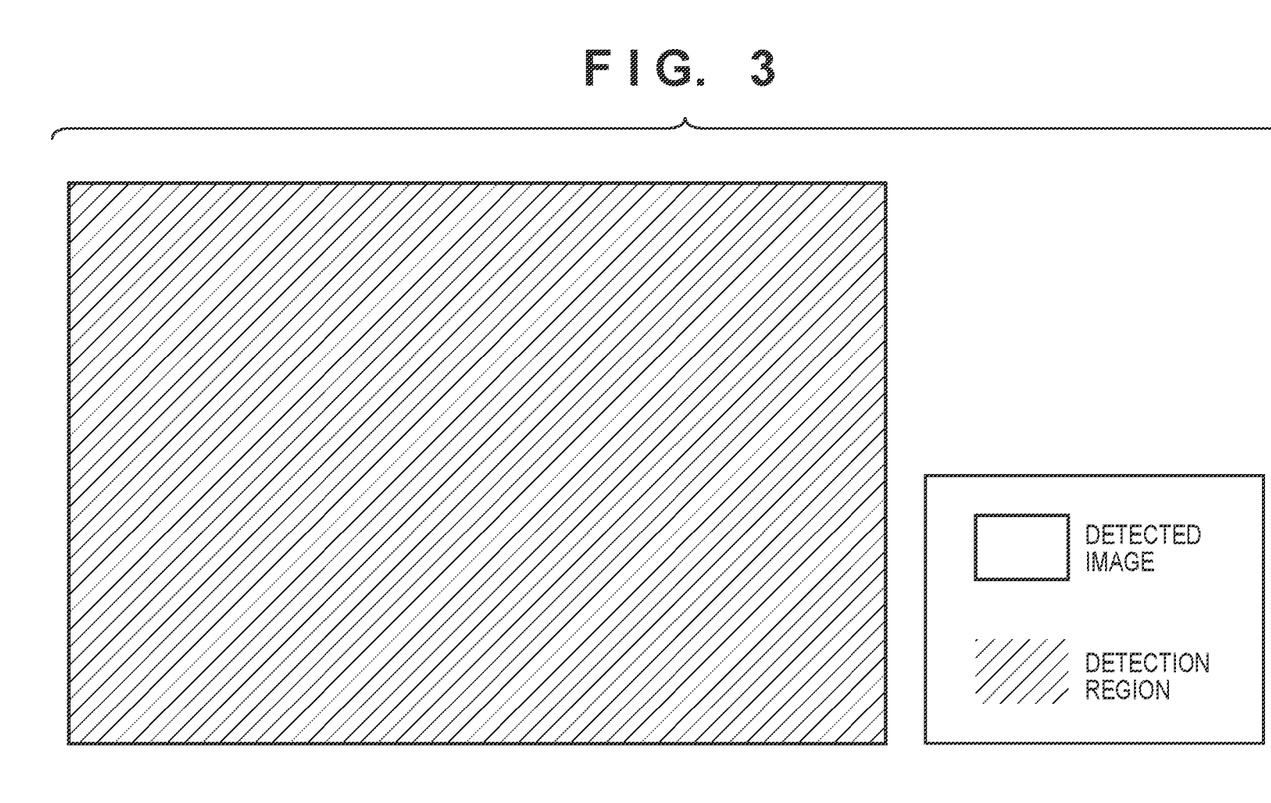
FIG. 3 is a diagram for describing a detection region for a case where the capturing field angle has not changed according to the flicker detection processing of embodiments and exemplary modifications of the present invention.

In step S202, the camera control unit 101 performs control so as to restrict a reference region (detection region) in each captured image in connection with flicker detection to be performed by the flicker detection unit 114 based on the detected image group. As opposed to flicker detection that is performed by evaluating the luminance while using the entire region (or a fixed region) of each captured image as the detection region as shown in FIG. 3 in a case where the luminance of the ambient light is stable in the detected image group, the aforementioned restriction uses a smaller region as the detection region.

Figure 4:
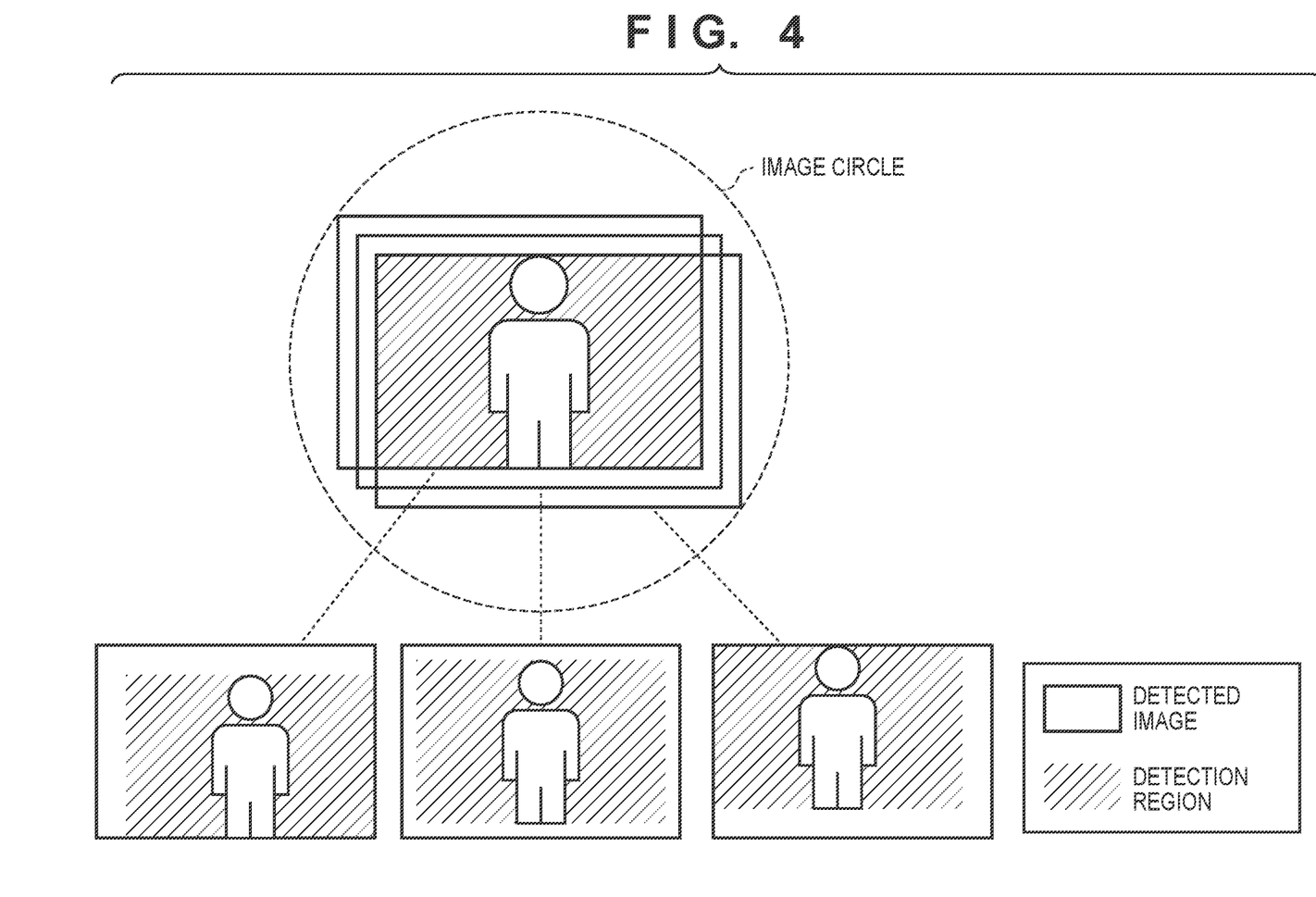
FIG. 4 is a diagram for describing detection regions for a case where the capturing field angle has changed according to flicker detection processing of a first embodiment of the present invention.

For example, in a case where three captured images included in the detected image group have been captured so as to hold the positional relationship shown in FIG. 4 when they have been stacked in such a manner that their image circles at the time of image capture coincide with one another, the detection regions may be restricted within the hatched overlapping regions. In this way, the similarity among subject images that appear in the restricted detection regions in respective captured images becomes high; as a result, the luminance of the ambient light inside the regions becomes stable, and the accuracy of detection of flicker can be increased.

The amount of such restriction on a detection region (the amount/percentage of reduction from a detection region for a case where the capturing field angle did not change) may be set based on information of the shift amounts associated with respective images in the detected image group. More specifically, the camera control unit 101 can set the size of a detection region in connection with the detection processing performed by the flicker detection unit 114 by determining the size of the detection region based on information of the shift amounts associated with the detected image group and transmitting the determined size to the flicker detection unit 114.

In step S203, the flicker detection unit 114 executes detection processing for detecting whether there is flicker in an image capturing environment related to the detected image group under control of the camera control unit 101. As a result of the execution of the detection processing, the flicker detection unit 114 derives whether there is flicker in the image capturing environment, as well as information of the frequency thereof when there is flicker, and completes the present flicker detection processing. This execution result is stored to, for example, the work memory 103 and used to change the image capturing settings and correct the captured images.

The detection processing executed in the present step is carried out based on information of the set detection regions. That is to say, in a case where it has been determined that the capturing field angle did not change in step S201, the detection processing is executed while using the entire regions of the detected image group as the detection regions. Also, in a case where it has been determined that the capturing field angle changed in step S201, the detection processing is executed while using the regions that have been restricted in size compared to the case where the capturing field angle did not change as the detection regions. It is sufficient to determine the positions of the detection regions in the latter case in accordance with the shift amounts associated with respective captured images for each captured image as exemplarily shown in FIG. 4.

Note that although the present embodiment is described assuming that the position of a detection region for a case where the capturing field angle changed is determined in accordance with a shift amount, in a case where, for example, there is information of the result of detection of a main subject region, the position of a detection region may be determined while using the position of this main subject region as a basis. In this way, the luminance of ambient light in each detection region related to the detected image group can be further stabilized.

As described above, according to the detection apparatus of the present embodiment, whether there is flicker can be detected favorably even in a case where the capturing field angle changes. More specifically, a favorable result of flicker detection can be achieved while reducing the amount of computation, even for a captured image group that was captured during a period with a change in the capturing field angle that could possibly influence flicker detection. Therefore, flicker detection can be performed during an initialization operation of the image stabilizing mechanism associated with optical image stabilization at the time of, for example, activation of the digital camera 100; thus, favorable image capture can be performed at a timing desired by the user.

First Exemplary Modification

Although the above embodiment has been described in relation to a mode in which the sizes of restricted detection regions are dynamically determined based on information of the shift amounts of the shift lens that are respectively associated with the images in the detected image group, embodiments of the present invention are not limited by this. For example, as an operation that has been determined in advance is performed as an initialization operation and the like of the image stabilizing mechanism, a pre-fixed size, such as a percentage in an entire region, may be set as the size of a restricted detection region. Alternatively, also with respect to other operations of the image stabilizing mechanism that could possibly cause a change in the capturing field angle by which flicker detection could possibly be influenced, one of pre-set sizes (that are smaller than an entire region) may be selected and set in accordance with, for example, the maximum value of the differences among the shift amounts. Furthermore, which size is used as the size of a restricted detection region is not limited to being determined based on a shift amount, and may be determined based on the type of an operation performed by the image stabilizing mechanism.

Second Exemplary Modification

The above embodiment and exemplary modification have been described in relation to a mode in which, in a case where an operation that is not intended for image stabilization is performed among the operations of the image stabilizing mechanism associated with optical image stabilization, a change in the capturing field angle that could possibly influence flicker detection is considered to occur, and a detection region is restricted. However, embodiments of the present invention are not limited to this, and other operations of the image stabilizing mechanism associated with optical image stabilization may be included as targets of restriction of a detection region.

For example, in a mode in which an acceptable speed (or acceleration) is set for the movement of the shift lens, in a case where at least one of the position and orientation of the digital camera 100 has changed suddenly, there is a possibility that a change in the capturing field angle cannot be fully absorbed even if an image stabilizing operation has been performed. In other words, even in a case where the detected image group has been obtained in a state where an initialization operation and the like have been completed and the image stabilizing mechanism associated with optical image stabilization has been able to achieve favorable image stabilization, the present invention can be applied in a case where a camera shake that cannot be fully absorbed by this image stabilizing mechanism has occurred during a period of image capture therefor. That is to say, although such a detected image group include captured images that differ from one another in the capturing field angle, favorable flicker detection can be realized by restricting a detection region with use of the present invention.

Third Exemplary Modification

Although the above embodiment and exemplary modifications have been described assuming that a change in the capturing field angle that could possibly influence flicker detection occurs due to an operation of the image stabilizing mechanism associated with optical image stabilization, embodiments of the present invention are not limited to this. For example, the present invention can be applied also to a configuration in which the digital camera 100 includes, as the image stabilizing mechanism for image stabilization, a mechanism in the form of an imager image stabilizer (IIS) in place of a mechanism in the form of an optical image stabilizer.

In this case, it is sufficient to detect a change in the capturing field angle during image capture for the detected image group as a change that occurs due to an operation of the image stabilizing mechanism associated with imager image stabilization. This image stabilizing mechanism moves the position of the image sensor itself (in the direction in the direction in which image blur is cancelled out), thereby changing the range of an optical image formed on the image sensor 105 and realizing a reduction in image blur. This image stabilizing mechanism is driven and controlled based on, for example, a driving amount derived based on an output of the gyroscope 112, similarly to the image stabilizing mechanism associated with optical image stabilization.

Therefore, it is sufficient for the field angle change detection unit 113 to determine whether the capturing field angle changed during image capture for the detected image group based on information of the driving status and the driving amount of the image stabilizing mechanism associated with imager image stabilization. That is to say, similarly to the aforementioned embodiment and the like, a detection region is restricted when this image stabilizing mechanism has executed an operation that is not intended for image stabilization, such as an initialization operation and control for movement to a predetermined position, and when a camera shake that cannot be fully absorbed has occurred even during an operation that is intended for image stabilization.

Note that although the present exemplary modification is described assuming that the digital camera 100 includes the image stabilizing mechanism associated with imager image stabilization in place of the image stabilizing mechanism associated with optical image stabilization, embodiments of the present invention do not exclude an apparatus that includes both of these mechanisms. For example, in a case where these image stabilizing mechanisms coexist and operate in coordination with each other in a mode related to an image capturing apparatus with an interchangeable lens and the like, it is permissible to adopt a configuration in which a detection region associated with flicker detection is restricted in accordance with the driving status of at least one of the image stabilizing mechanisms.

Second Embodiment

Although the above embodiment and exemplary modifications have been described in relation to a mode in which the digital camera 100 includes the image stabilizing mechanism and the capturing field angle changes depending on an operation of this image stabilizing mechanism during a period of image capture for a detected image group, embodiments of the present invention are not limited by this. That is to say, although the aforementioned mechanical image stabilizing mechanism is not necessarily included in every image capturing apparatus, the present invention can be applied as long as an image capturing apparatus is configured to be capable of obtaining state information indicating at least one of the position and orientation of the image capturing apparatus. For example, the present invention can be implemented also on an image capturing apparatus that includes the aforementioned gyroscope 112, and an image capturing apparatus that includes an electric image stabilizer (EIS) function.

Figure 5:
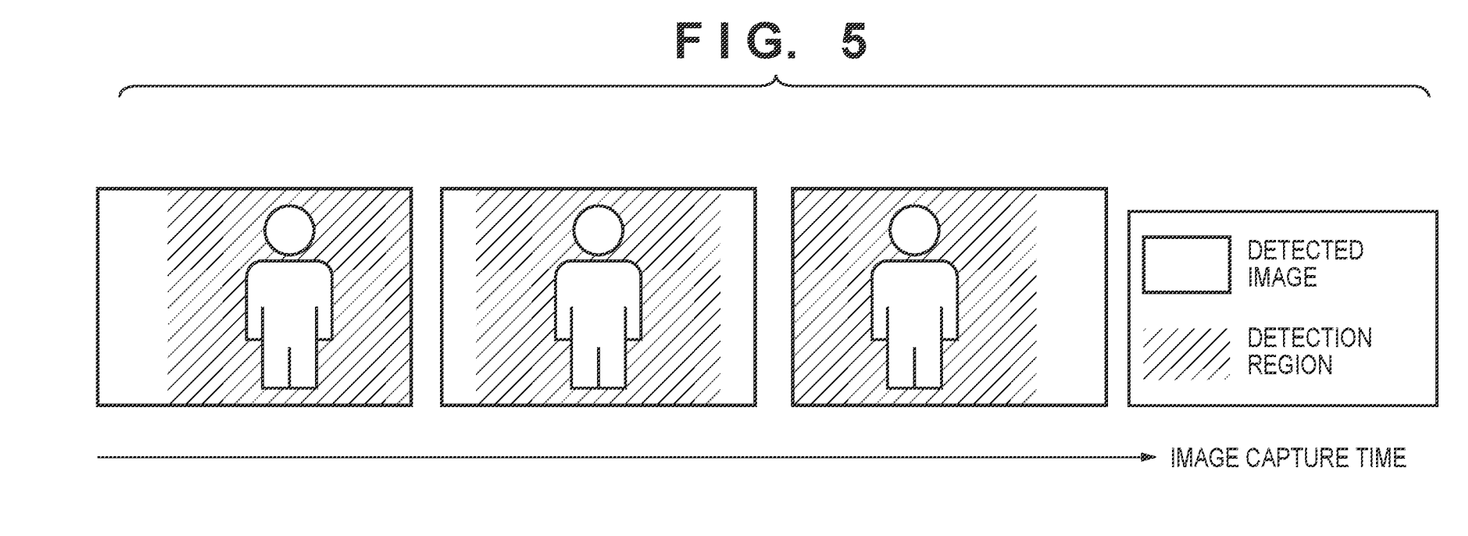
FIG. 5 is a diagram for describing detection regions for a case where the capturing field angle has changed according to flicker detection processing of a second embodiment of the present invention.

The following describes a mode of flicker detection for a case where a detected image group has been captured (the capturing field angle has changed) while the digital camera 100 was moving sequentially in the rightward direction relative to an subject (the horizontally rightward direction of the captured images) as shown in FIG. 5, for example. In FIG. 5, three captured images that compose the detected image group are shown arranged in the rightward direction (the positive direction along a time axis) of the figure, in ascending order of image capture time. With respect to such a change in the capturing field angle, the camera control unit 101 derives an image surface movement amount of an optical image of a subject based on an output from the gyroscope 112, and sets the sizes of restricted detection regions based thereon. Then, the flicker detection unit 114 sets detection regions based on the sizes of restricted detection regions respectively for the captured images, as indicated by hatching in FIG. 5, and performs detection processing.

Note that although the present specification has described different modes of embodiment using the first and second embodiments and the first, second, and third exemplary modifications, these modes may be combined in any manner in embodying the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-148444, filed Sep. 3, 2020, which is hereby incorporated by reference herein in its entirety.

What is claimed is:

1. A detection apparatus that detects whether there is flicker attributed to a light source, the detection apparatus comprising
   at least one processor or circuit configured to perform operations of the following units:
   a first obtainment unit configured to obtain a plurality of captured images related to a subject by performing image capture continuously with use of an image sensor;
   a determination unit configured to determine whether a capturing field angle has changed due to an operation of an image stabilizing mechanism during the image capture for the plurality of captured images; and
   a detection unit configured to detect whether flicker of a predetermined level has occurred based on the plurality of captured images obtained by the first obtainment unit,
   wherein in a case where the determination unit has determined that the capturing field angle has changed due to the operation of the image stabilizing mechanism during the image capture for the plurality of captured images, the detection unit restricts regions in the plurality of captured images used for detecting whether the flicker of the predetermined level has occurred.

2. The detection apparatus according to claim 1, wherein the detection unit makes the regions in the plurality of captured images used for detecting whether the flicker of the predetermined level has occurred smaller in a case where the determination unit has determined that the capturing field angle has changed than in a case where the determination unit has determined that the capturing field angle has not changed due to the operation of the image stabilizing mechanism during the image capture for the plurality of captured images.

3. The detection apparatus according to claim 1, wherein the at least one processor or circuit further configured to perform operations of
   a second obtainment unit configured to obtain information indicating a driving status of the image stabilizing mechanism during the image capture for the plurality of captured images,
   wherein the determination unit determines whether the capturing field angle has changed due to the operation of the image stabilizing mechanism during the image capture for the plurality of captured images based on the information indicating the driving status of the image stabilizing mechanism obtained by the second obtainment unit.

4. The detection apparatus according to claim 1, wherein the image stabilizing mechanism includes a lens driving mechanism associated with optical image stabilization.

5. The detection apparatus according to claim 1, wherein the image stabilizing mechanism includes an image sensor driving mechanism associated with imager image stabilization.

6. The detection apparatus according to claim 1, wherein the detection unit restricts the regions used for detecting whether the flicker of the predetermined level has occurred in a case where it has been determined that the capturing field angle has changed due to the operation of the image stabilizing mechanism during the image capture for the plurality of captured images and the operation of the image stabilizing mechanism is not intended for image stabilization.

7. The detection apparatus according to claim 6, wherein the operation that is not intended for image stabilization includes an initialization operation of the image stabilizing mechanism.

8. The detection apparatus according to claim 6, wherein the operation that is not intended for image stabilization includes an operation of driving the image stabilizing mechanism to a pre-set state.

9. The detection apparatus according to claim 1, wherein the at least one processor or circuit further configured to perform operations of
  a third obtainment unit configured to obtain state information indicating at least one of a position and an orientation of an image capturing apparatus that has captured the plurality of captured images during the image capture for the plurality of captured images,
  wherein the determination unit determines whether the capturing field angle has changed due to the operation of the image stabilizing mechanism during the image capture for the plurality of captured images based on the state information obtained by the third obtainment unit.

10. The detection apparatus according to claim 1, wherein the detection unit sets different amounts of restriction for the regions used for detecting whether the flicker of the predetermined level has occurred depending on a magnitude of the change in the capturing field angle.

11. An image capturing apparatus, comprising:
  an image sensor; and
  at least one processor or circuit configured to perform operations of the following units:
  a first obtainment unit configured to obtain a plurality of captured images related to a subject by performing image capture continuously with use of the image sensor;
  a determination unit configured to determine whether a capturing field angle has changed due to an operation of an image stabilizing mechanism during the image capture for the plurality of captured images; and
  a detection unit configured to detect whether flicker of a predetermined level has occurred based on the plurality of captured images obtained by the first obtainment unit,
  wherein in a case where the determination unit has determined that the capturing field angle has changed due to the operation of the image stabilizing mechanism during the image capture for the plurality of captured images, the detection unit restricts regions in the plurality of captured images used for detecting whether the flicker of the predetermined level has occurred.

12. A control method for a detection apparatus that detects whether there is flicker attributed to a light source, the control method comprising:
  obtaining a plurality of captured images related to a subject by performing image capture continuously with use of an image sensor;
  determining whether a capturing field angle has changed due to an operation of an image stabilizing mechanism during the image capture for the plurality of captured images; and
  detecting whether flicker of a predetermined level has occurred based on the plurality of captured images obtained in the obtaining,
  wherein in a case where it has been determined, in the determining, that the capturing field angle has changed due to the operation of the image stabilizing mechanism during the image capture for the plurality of captured images, the detecting restricts regions in the plurality of captured images used for detecting whether the flicker of the predetermined level has occurred.

13. A non-transitory computer-readable recording medium having recorded therein a program for causing a computer to function as each unit of the detection apparatus according to claim 1.

* * * * *